US011997003B1

(12) United States Patent
Judge et al.

(10) Patent No.: US 11,997,003 B1
(45) Date of Patent: *May 28, 2024

(54) ANALYSIS OF TRANSMISSION CHARACTERISTICS IN A VOICE-OVER-IP NETWORK

(71) Applicant: 8×8, Inc., Campbell, CA (US)

(72) Inventors: Garth Judge, Campbell, CA (US); Huw Rees, Campbell, CA (US)

(73) Assignee: 8×8, Inc., Campbell, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/463,819

(22) Filed: Sep. 1, 2021

Related U.S. Application Data

(63) Continuation of application No. 16/419,591, filed on May 22, 2019, now Pat. No. 11,115,313, which is a continuation of application No. 14/597,477, filed on Jan. 15, 2015, now Pat. No. 10,333,824, which is a continuation-in-part of application No. 13/732,605, filed on Jan. 2, 2013, now Pat. No. 9,148,519.

(60) Provisional application No. 62/098,694, filed on Dec. 31, 2014.

(51) Int. Cl.
| | |
|---|---|
| *H04L 12/727* | (2013.01) |
| *H04L 12/26* | (2006.01) |
| *H04L 12/721* | (2013.01) |
| *H04L 43/0829* | (2022.01) |
| *H04L 43/0852* | (2022.01) |
| *H04L 45/00* | (2022.01) |
| *H04L 45/121* | (2022.01) |

(52) U.S. Cl.
CPC ........ *H04L 45/121* (2013.01); *H04L 43/0835* (2013.01); *H04L 43/0852* (2013.01); *H04L 45/70* (2013.01)

(58) Field of Classification Search
CPC ............. H04L 43/0835; H04L 43/0852; H04L 45/121; H04L 45/70
See application file for complete search history.

(56) References Cited

U.S. PATENT DOCUMENTS

| | | | | |
|---|---|---|---|---|
| 6,512,761 B1 * | 1/2003 | Schuster | ............. | H04L 12/1485 |
| | | | | 370/352 |
| 7,564,835 B1 * | 7/2009 | Grabelsky | ............. | H04L 65/103 |
| | | | | 709/219 |
| 7,831,715 B2 * | 11/2010 | Yoshimi | ................ | H04L 67/143 |
| | | | | 709/203 |
| 8,005,961 B2 * | 8/2011 | Tanimoto | ............... | H04L 67/288 |
| | | | | 709/227 |
| 10,742,540 B2 * | 8/2020 | Shimazawa | ............. | H04L 45/22 |

(Continued)

*Primary Examiner* — Rasheed Gidado
(74) *Attorney, Agent, or Firm* — Crawford Maunu PLLC

(57) ABSTRACT

Various example implementations are directed to circuits, apparatuses and methods for providing Voice-over-IP (VoIP) services. According to an example embodiment, an apparatus includes a first network node configured to communicate VoIP packets between upstream and downstream network nodes in a network and to communicate metadata with at least one of the VoIP packets downstream in the network. A network pathway assessment module is configured to derive, from the response packet one or more transmission characteristics (e.g., latency) corresponding to the VoIP packets communicated along a pathway between the first network node and the second network node and VoIP packets may be routed in response thereto.

20 Claims, 6 Drawing Sheets

(56) References Cited

U.S. PATENT DOCUMENTS

| | | | | |
|---|---|---|---|---|
| 2002/0118398 | A1* | 8/2002 | Tanimoto | H04L 67/51 |
| | | | | 358/407 |
| 2006/0256771 | A1* | 11/2006 | Yarlagadda | H04L 65/1101 |
| | | | | 370/352 |
| 2009/0268713 | A1* | 10/2009 | Ottur | H04L 43/50 |
| | | | | 370/352 |
| 2013/0232223 | A1* | 9/2013 | Ma | H04L 65/765 |
| | | | | 709/217 |

* cited by examiner

ANALYSIS OF TRANSMISSION CHARACTERISTICS IN A VOICE-OVER-IP NETWORK

FIELD OF THE INVENTION

The present disclosure relates to Voice-over-IP (VoIP) communications.

Overview

VoIP technology allows for calls to be made using internet connections. VoIP technology can be used in place of traditional analog/digital phone lines and can also be used to supplement traditional phone lines. Depending upon the type of VoIP servers and the VoIP provider's capabilities, VoIP calls can be made between VoIP users and/or to anyone having a telephone number (e.g., calls to local, long distance, mobile, and/or international numbers). VoIP calls can be initiated and received using a general purpose computer (e.g., using software that provides a soft phone interface), specialized hardware (e.g., a VoIP-enabled telephone), or specialized interface equipment (e.g., a VoIP adapter for an analog telephone). VoIP call connections can be handled using a variety of different protocols, mechanisms and systems.

Aspects of the present disclosure are believed to be applicable to a variety of different types of apparatuses, systems and methods involving VoIP communication. In certain implementations, aspects of the present disclosure have been shown to be beneficial when used in the context of routing VoIP data in a network having a plurality of nodes, which provide multiple paths for routing of VoIP data to a destination endpoint. While not necessarily so limited, various aspects may be appreciated through a discussion of examples using such exemplary contexts.

According to an example embodiment, an apparatus includes a first network node configured to communicate VoIP-packets between upstream and downstream network nodes in a network and to communicate metadata with at least one of the VoIP packets downstream in the network. The apparatus also includes a second network node configured to receive the set of metadata and at least one VoIP packet and communicate the at least one of the VoIP packet further downstream in the network. The second network node is also configured to send a response packet upstream in response to receiving the metadata. A network pathway assessment module is configured to derive, from the response packet a latency corresponding to the VoIP-packets communicated along a pathway between the first network node and the second network node.

According to another example embodiment, an apparatus includes a plurality of relay servers connected as a subset of nodes in a network. Each of the relay servers is configured to, in response to receiving a VoIP packet from an upstream node in the network, communicate the VoIP packet along a path via a downstream node in the network. The relay server communicates a first set of metadata along with the VoIP packet to the downstream node if the metadata is not included in the received VoIP packet. Each relay server is configured to provide a response packet, including a second set of metadata, to an upstream node in response to receiving the first set of metadata from the upstream node. Each relay server is configured to, in response to receiving the second set of metadata from the downstream node, deriving one or more transmission characteristics of a path between the relay server and the downstream node from the second set of metadata. The one or more transmission characteristics including a latency exhibited by the path between the relay server and the downstream node. The apparatus also includes a call control server communicatively connected to the plurality of relay servers and configured to, in response to a connection request for a VoIP call, select one of the plurality of relay servers according to the determined transmission characteristics. In response to the selection, the call control server routes VoIP packets for the VoIP call through the selected relay server.

According to another example embodiment, a method for VoIP communication includes, routing the VoIP packets along a path through a network including plurality of nodes. The VoIP packets are supplemented with a set of metadata. At one or more nodes on the path through the network, the metadata is respectively used to determine transmission characteristics including at least a latency of a path to or from the node. Subsequent VoIP packets are routed as a function of the determined transmission characteristics.

BRIEF DESCRIPTION OF THE DRAWINGS

The disclosure may be more completely understood in consideration of the following detailed description of various embodiments of the disclosure in connection with the accompanying drawings, in which.

Figure 1:
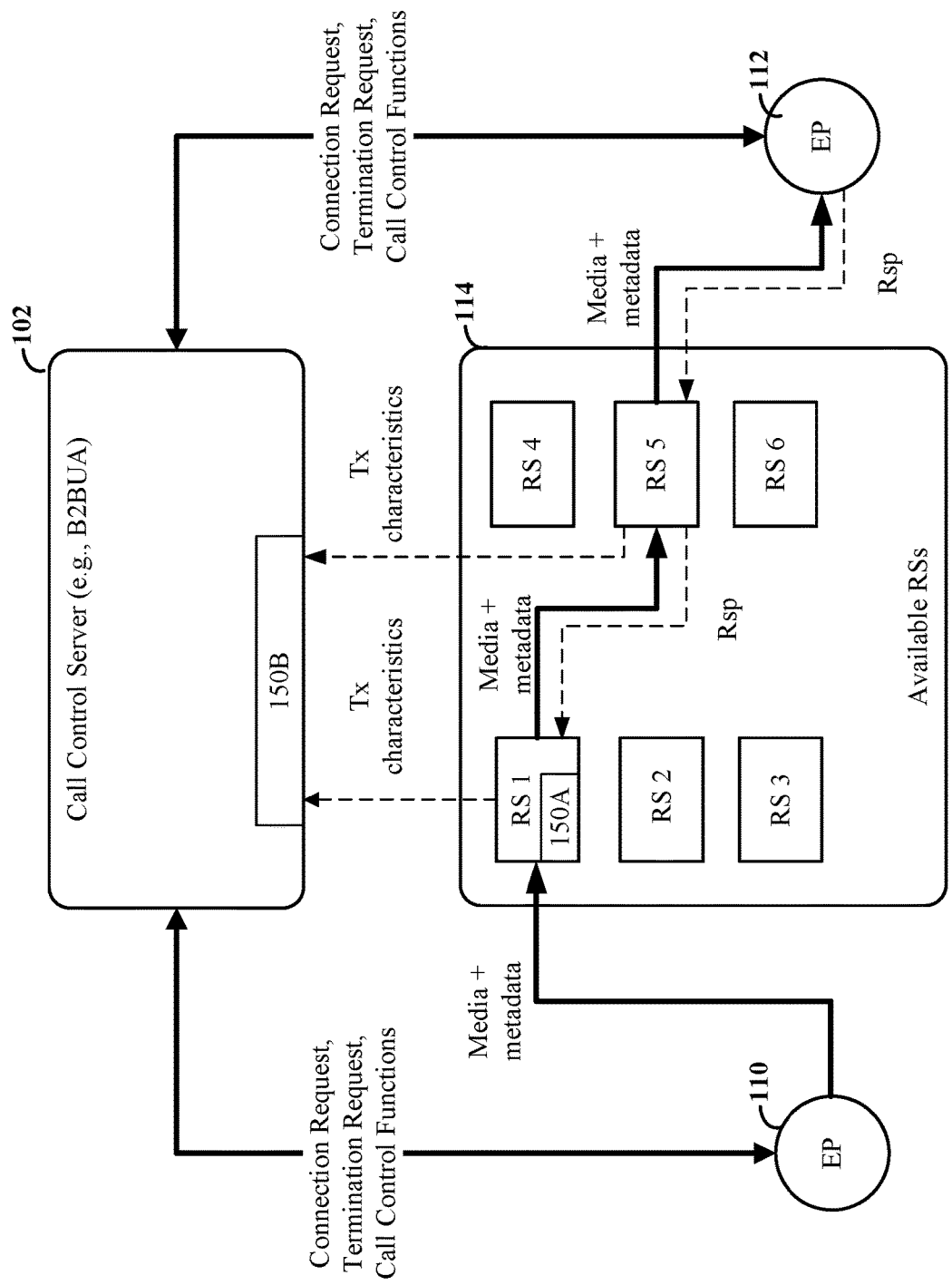
FIG. 1 depicts a system for establishing a call between two endpoint devices by selecting between geographically disparate relay servers, consistent with one or more embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements VoIP communication. For ease of explanation, the examples and embodiments herein are primarily described with reference to communication of VoIP calls in a network having a plurality of network nodes, which provide multiple paths for routing of VoIP data to a destination endpoint. While not necessarily so limited, various aspects may be appreciated through a discussion of examples using such exemplary contexts.

In some various embodiments, a network node is configured to communicate VoIP packets between upstream and downstream nodes in a network. The network node is also configured to communicate metadata along with the VoIP packets to facilitate determination of transmission characteristics of available connections in the network. In an example embodiment, a first network node is configured to communicate a set of metadata along with a VoIP packet to a second network node downstream to the first network node. The second network node is configured to receive the set of metadata and at least one VoIP packet and communicate the at least one of the VoIP packet further downstream in the network. The second network node is also configured to send a response packet upstream in response to receiving the metadata. A network connection assessment module is configured to derive one or more transmission characteristics of a connection between the first and second network nodes from the response packet. The transmission characteristics may include, for example, latency, packet loss, bandwidth, and/or quality of service. In different implementations, the network connection assessment module may be incorporated into the first network node or another upstream node. The determined transmission characteristics may be used to adjust various routing and/or VoIP call parameters to improve performance of VoIP communication via the network nodes.

The embodiments may be applicable to various types of network nodes that communicate VoIP packets in a network including but not limited to routers, switches, and/or relay servers (e.g., media relay servers). For ease of explanation, the following examples are primarily described with reference to a network including a plurality of relay servers that may be selected for routing of any particular VoIP call. Relay servers serve to route media packets (e.g., audio data packets) for a VoIP call between endpoint devices and also function as intermediaries between endpoint devices. For instance, a relay server may convert received audio media so that endpoint devices using different transmission protocols. In some implementations, relay servers may also be configured to provide various additional VoIP-relayed functions including, for example, network-address-translation (NAT) traversal service. NAT traversal allows a device behind any type of symmetrical or restrictive network device that performs NAT to be able to make a VoIP call.

In some embodiments, a call control server is configured to setup and terminate VoIP sessions between endpoint devices in response to signaling commands from the endpoint devices. In response to a connection request for a VoIP call from an endpoint device, the call control server selects one or more of the plurality of relay servers and routes the VoIP call using the selected relay servers. In some various embodiments, the call control server is configured to select relay servers for routing of VoIP calls based on the determined transmission characteristics (e.g., latency, packet loss, bandwidth, and/or quality of service) of available connections in the network.

In some embodiments, one or more relay servers, connected as nodes in a network, are configured to communicate metadata along with the VoIP packets to facilitate determination of transmission characteristics of links between nodes in the network. For example, in response to receiving a VoIP packet from an upstream node, a first relay server is configured to communicate a VoIP packet along with a first set of metadata to a downstream node in the network. The downstream node may be any of various network devices including, for example, another relay server, an IP router or switch, or an endpoint device. By communicating metadata along with existing VoIP packets, transmission characteristics of network links can be determined with little additional overhead.

The first set of metadata includes information to facilitate determination of transmission characteristics of a link between the first relay server and the downstream node. In some implementations, the first set of metadata may include a command (e.g., an echo request) that prompts the downstream node to send a response packet indicative of the transmission characteristics to an upstream node (e.g., the first relay server). The upstream node includes a network connection assessment module configured to derive the transmission characteristics of the link from the response packet. For example, the first relay server may be configured to determine a latency of a link between the first relay server and the downstream node by comparing a first time at which the metadata is communicated downstream and a second time at which the response packet is received. In some other implementations the metadata and/or the response packet may include transmission timestamps from which latency may be determined. For instance, a response packet may indicate a first time at which the response packet is sent. An upstream node receiving the response packet may determine a latency by comparing the first time indicated in the response packet to a second time at which the response packet is received. In some implementations, the response packet may additionally or alternatively report transmission characteristics (e.g., a packet loss count) observed by the second downstream node.

The apparatus also includes a call control server communicatively connected to the plurality of relay servers and configured to, in response to a connection request for a VoIP call, select one of the plurality of relay servers as a function of the determined transmission characteristics. In response to the selection, the call control server routes VoIP packets for the VoIP call through the selected relay server. This can be accomplished, for example, by providing the calling and/or called VoIP device with identifying information (e.g., an IP address) for the selected/particular relay server. The call control server then allows the call to proceed while maintaining a call state for the VoIP call with the voice media being routed through the particular relay server during the call.

In some implementations, the call control server is configured to adjust routing and/or transmission characteristics dynamically during a VoIP call in response to transmission characteristics derived using the metadata. For example, the control server may direct a selected relay server to change the certain bitrate or transmission protocol of the VoIP call based on the determined transmission characteristics. As another example, the control server may direct a selected relay server to route a VoIP call using a different path or to handoff the VoIP call to another relay server.

The call control server in the network may use various signaling protocols, such as the Session Initiation Protocol (SIP), to setup, terminate and control VoIP calls in response to endpoint commands. In some implementations, the call control server may effectively split a call into two legs by operating two independent call control protocols on each side of the communication session. The call control server may include, for example, a back-to-back user agent (B2BUA) an IP private branch exchange server (IP-PBX) or a contact center application. In some implementations the call control server may also oversee and provide additional control and other VoIP related features (e.g., billing, automatic call disconnection, call transfer, etc.).

In some implementations the call control server is to provide network-address-translation (NAT) traversal services, by providing a mechanism via which all media to and from the user's VoIP device is relayed through a relay server. The call control server uses a relay server control protocol to communicate with the relay server to establish and control the media relay path.

Aspects of the present disclosure recognize that collocation of the call control server and relay server is not always desirable and further identifies problems with collocation that are not readily apparent. Based upon these and other recognitions, embodiments of the present disclosure provide solutions that allow the functions of the call control server and relay server to reside in different physical locations (e.g., datacenters), even to the extent that they can be located in disparate locations around the globe. It is also recognized that the physical location can be relevant to more than just the distance between two communicating devices. The logical connections and transmission/media path between the devices can vary significantly even when the physical distances are relatively equal.

A particular recognition is that the transmission/media path for the call signaling (e.g., SIP) flow is less critical in terms of parameters associated with physical location. For instance, the latency of the media path, the variability of the latency (jitter) and the potential for dropped packets are each a factor that generally will have less stringent demands for the call control server than for the relay server. This realization suggests that servers providing call control server functionality can be located substantially independent of their physical location, e.g., nearly anywhere in the world.

Various aspects and embodiments of the present disclosure recognize the importance of selecting a relay server based upon the effect of the selected relay server on real-time media flow on the IP network. Accordingly, a relay server can be selected based upon derived transmission characteristics of its media flow path. For instance, this type of selection can be made with the goal of an improved real-time audio/video experience due to the fact there are few dropped packets and/or that the media latency and "jitter" (fluctuations in latency) are low.

The selection algorithm used by the call control server may select a relay server to use for routing a call based on various criteria, for example, to improve VoIP call quality, reduce monetary costs, and/or perform load balancing across the relay servers.

As one example, the selection algorithm may select a relay server to reduce latency of the path between the endpoints of the VoIP call. As another example, the selection algorithm may select a relay server to route VoIP calls on paths that exhibit less variation in latency. Consistent latency of network paths is beneficial for some various VoIP features. For instance, in some implementations, a VoIP system may be configured to ring multiple endpoints (e.g., a ring group) simultaneously. Changes in latency of paths to the multiple endpoints may cause signaling of the endpoint to become unsynchronized. For example, if a ring signal is sent to a first endpoint in the group and a delayed signal is sent to a second in the group, a user at the second endpoint could try to pick up a line that has already been picked up. In some implementations, the selection algorithm may be configured to select paths for routing VoIP signals/data to multiple endpoint so that each of the paths exhibit approximately the same latency.

As another example, predictive algorithms can be used to account for future changes in load due to calls being terminated. Thus, expected/average call times can be used to maintain a desired balance by distributing incoming calls to account for expected call lengths in order to avoid large swings in relay server loading due to groups of calls terminating around the same time. In this manner, a relay server could temporarily be given a slightly higher load when a large number of existing calls are expected to be terminated in a short time. The selection algorithm can also attempt to distribute calls between relay servers according to their expected call completion times to reduce the likelihood of large load variances due to calls ending near the same time. Further parameters can be derived from information relating to the Internet Service Provider (ISP) used by the endpoints/customers. For instance, knowledge of an ISP's routing behavior (e.g., direct peering capabilities) can be used to influence the relay server selection policy.

Consistent with certain embodiments, a system can be configured to consider service levels for a particular user. For instance, a first set of users may subscribe to or use a relatively high cost business service, whereas a second set of users may subscribe to or use a low cost (or even free) personal service. The system can be designed to provide priority to the first set of users. As a non-limiting example, customers may be offered discounted VoIP services in exchange for agreeing to be given a lower priority for access to call-quality related system components, and particularly, to high-quality relay server. This can further facilitate load balancing between relay servers. For instance, lower priority call requests can use an algorithm in which the load balancing is of high priority, but other factors are of lower priority. Higher priority call requests can use an algorithm in which load balancing is given a relative low priority. Thus, the higher priority call requests will generally be assigned to relay servers that are closer to the call origination point. This may result in an uneven distribution of calls between relay servers (e.g., where a call volume is particularly high from a particular location). As long as there are a sufficient number of lower priority call requests, however, the load distribution profile between relay servers can remain relatively balanced.

Additional embodiments of the present disclosure are directed toward a system that is configured and arranged to dynamically switch between relay servers during a call. For instance, the call control server can detect or determine that a switch to a new relay server is desirable. In response to this determination, the relay server can select a new relay server using an appropriate selection algorithm. In one implementation, the call control server can then instruct the endpoints to begin a new media stream with the newly selected relay server. The old media stream can be discontinued. In certain implementations, the system allows for two simultaneous media streams to be operating, while the endpoints use only one for final display/presentation to an end user. This can reduce the potential for lost packets/audio/video during the switch. Particular embodiments can establish a separate buffer for each media stream at the endpoints. The endpoints can then monitor the respective buffers to identify when to switch between media streams (e.g., using time stamps to identify when the buffers are relative synchronized).

Turning now to the figures, FIG. 1 shows a system for establishing a call between two endpoint devices by selecting between geographically disparate relay servers (RSs in figures), consistent with embodiments of the present disclosure. The system includes a plurality of relay servers 114 connected as nodes in a VoIP network. The relay servers 114 are configured to route VoIP packets for a VoIP call on a path between two endpoints (e.g., 110 and 112). As previously described, the one or more of the relay servers 114 are configured to communicate metadata along with the VoIP packets to facilitate determination of transmission characteristics (e.g., latency, packet loss, bandwidth, and/or quality of service) of links between nodes in the network.

As an illustrative example, FIG. 1, a relay server RS 1 and RS 5 are selected to route VoIP media from endpoint 110 to endpoint 112. In response to receiving the VoIP media packet, relay server RS 1 communicates the VoIP media packet along with a first set of metadata to the next downstream node on the path to endpoint 112 (relay server RS 5). The metadata may be provided to the relay server RS 1 from the endpoint 110 with the media packet, as shown in FIG. 1, or may be added by the relay server RS 1 in response to receiving the VoIP media packet without metadata.

In response to the first set of metadata, relay server RS 5 sends a response packet (Rsp) upstream to relay server RS 1. The first relay server RS 1 derives one or more transmission characteristics from the response packet Rsp, and provides the transmission characteristics to a call control server 102. The response packet and transmission characteristics are depicted by dashed lines in FIG. 1.

In response to receiving the VoIP media packet, relay server RS 5 communicates the VoIP media packet to the next downstream node in the path. In this example the next downstream node is endpoint 112. In this example, the relay server RS 5 is also configured to communicate metadata along with the VoIP media packet to endpoint 112. In response to the metadata, the endpoint 112 sends a response packet (Rsp) upstream to the relay server RS 5. The relay server RS 5 derives one or more transmission characteristics from the response packet Rsp, and provides the transmission characteristics to the control server 102.

In this example, the relay servers RS 1 and RS 5 are described as determining the transmission characteristics from the response packets. Such determination may be performed, for example by a network connection assessment module (e.g., 150A) located in the relay server. In some embodiments, transmission characteristics may additionally or alternatively be determined at other nodes in the network (e.g., call control server 102). For instance, in some implementations, the response packets may be forwarded by relay servers RS 1 and RS 5 to a network connection assessment module 150B located in the call control server 102 for determination of the transmission characteristics.

In this example, the call control server 102 is configured to setup and terminate VoIP sessions between endpoint devices 110 and 112 in response to signaling commands from the endpoint devices. In response to a connection request for a VoIP call from an endpoint device, the call control server 102 selects one or more of the plurality of relay servers and routes the VoIP call using the selected relay servers based on the determined transmission characteristics of connections in the network. The call control server 102 can be configured and arranged to provide various call control functions. At a basic level, the call control functions include call setup and teardown, but the call control functions can include a variety of additional features. Call control server 102 can operate using SIP. The use of SIP, however, is not required in all embodiments and various other call control protocols can be used. Thus, call control server 102 divides a call into two separate legs. Accordingly, certain embodiments are directed toward a call control server 102 that operates as a B2BUA or an IP-PBX.

When calling endpoint 110 attempts to initiate a call, it sends a call request to call control server 102. Call control server 102 then interfaces with the calling endpoint to set up a first leg of the call. The call control server 102 can then set up the second leg of the call by contacting answering endpoint 112. As part of the call setup, call control server 102 is configured and arranged to select one of the available relay servers 114. FIG. 1 depicts a separate relay server for each of the calling endpoints 110 and the answering endpoint 112; however, a single relay server can be used to carry out a call. Conversely, more than two relay servers may be used to communicate VoIP data between the calling and answering endpoints.

The call control server 102 can be configured to send instructions to the selected one of the relay servers 114 in order to establish the media relay/routing logic between the caller and called parties. The instructions can include the identification of a control protocol. The control protocol can define how, amongst other things, the relay server is to: establish, control, modify and tear down media relay sessions; provide media transcoding and/or encryption/decryption instructions, and/or retrieve media statistics and call quality metrics for a relay session.

The call control server 102 can also be configured to execute a selection algorithm that processes variables for the relay servers 114 in the list. In response to the selection algorithm, the call control server 102 is configured to select a particular relay server from the list. In response to the selection, the call control server 102 can direct an endpoint to route audio (and also video or other) media for the VoIP call through the particular relay server. The call control server 102 can also be configured to maintain a call state for the VoIP call while the voice media is routed through the particular relay server.

Consistent with certain embodiments call control server 102 can be configured and arranged to provide call management options to one or more participants in the VoIP call. The call management options can include features such as (but not necessarily limited to): call forwarding or translation to route calls to a particular telephone number to a specific device, hunt groups that allow multiple endpoints to be linked to a single telephone number and further allow for rules to be designed for call routing within the hunt group, call holding or call queuing, caller identification (ID), voice mail, interactive voice responses, fax to email, call recording and others.

In some embodiments, relay servers may be configured to provide various additional VoIP-relayed functions including, for example, NAT traversal service. This function is based upon the recognition that NAT can interfere with end-to-end connectivity between two endpoints attempting to establish a VoIP call. Embodiments of the present disclosure further recognize that NAT traversal can be accomplished using several different techniques, however, NAT behavior is not standardized and therefore certain techniques may not work with a particular NAT. Accordingly, more particular aspects of the present disclosure are directed toward the selection of a relay server based upon the existence and type of NAT for one or more of the endpoints and the NAT traversal capabilities of the relay servers in the list of relay servers. Another function of the relay servers relates to the ability to transcode audio/voice/video media. The transcoding provides a gateway/bridge between a source endpoint and a destination endpoint that use different codecs for the VoIP call.

The VoIP endpoints can be provided in the form of VoIP soft phones (software running on a computer processor circuit), VoIP hard phones (specially designed hardware phones and circuits) and/or VoIP adapter devices (specially designed hardware that provides an interface between an IP network and a standard public switch telephone network telephone device). Other types of VoIP endpoints are also possible including, but not necessarily limited to, mobile devices/telephones with Internet access.

Figure 2:
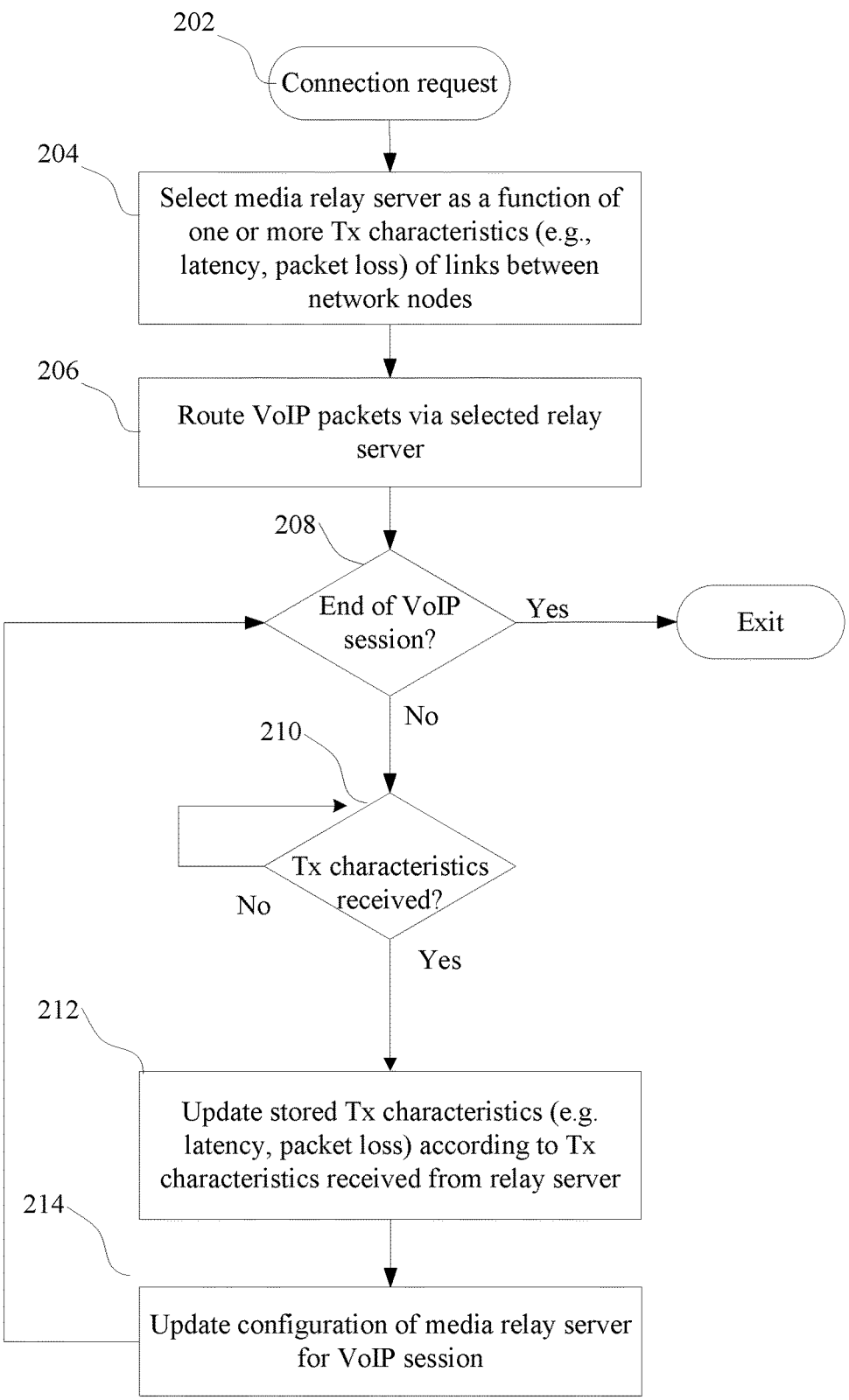
FIG. 2 shows a flowchart of a process for coordination of a VoIP session by a call control server, consistent with one or more embodiments of the present disclosure.

FIG. 2 shows a flowchart of a process for coordination a VoIP session by a call control server, consistent with one or more embodiments. The process is initiated in response to a connection request 202. At block 204, a relay server is selected as a function of one or more transmission characteristics of paths between network nodes including for example, latency and packet loss exhibited by the paths. At block 206, VoIP packets are routed via the selected relay server. While the VoIP session is active, decision block 208 directs the process to decision block 210. If transmission characteristics are received, decision block 210 directs the process to block 212. At block 212, stored transmission characteristic data for network paths are updated according to the received transmission characteristic data. As described above, in some implementations, the call control server may dynamically adjust routing of VoIP packets, or configuration setting of relay servers, in real time during a VoIP session. For example, at block 214 configuration of one or more relay servers may adjusted to change the codec or buffer size used by a relay server for communicating VoIP packets for a VoIP session. Such dynamic update may be useful in networks susceptible to large fluctuations in traffic flow. After updating the transmission characteristics at block 210 and/or the configuration of relay servers at block 212, the process is directed back to decision block 208.

Figure 3:
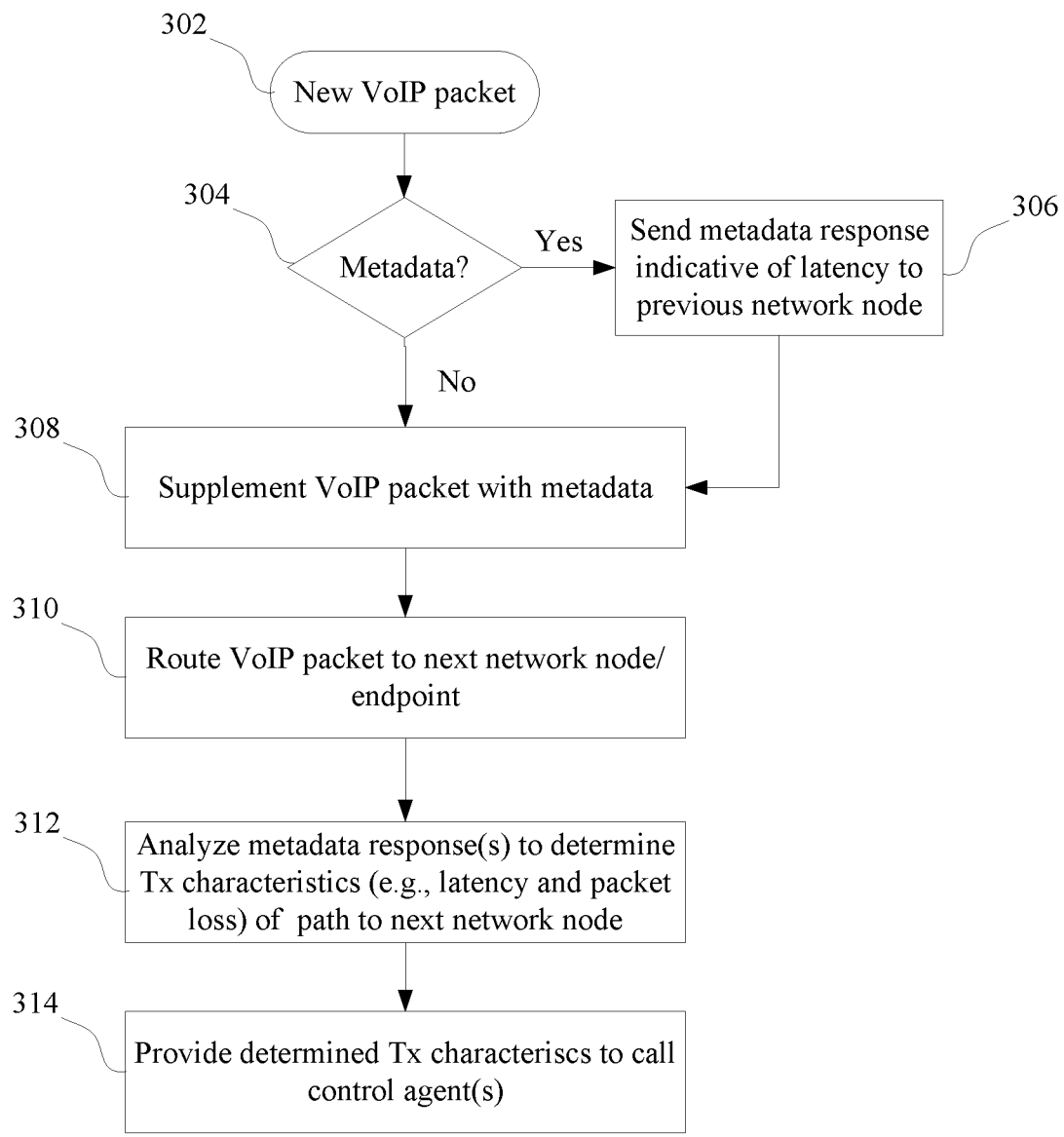
FIG. 3 shows a flowchart of a process for routing VoIP data, consistent with one or more embodiments of the present disclosure.

FIG. 3 shows a flowchart of a process for communicating VoIP data by a relay server, consistent with one or more embodiments. The process is initiated in response to receiving a new data packet 302 from an upstream node in the network. If the packet contains a first set of metadata, decision block 304 directs the process to send a response packet to the upstream node at block 306. As previously described, the response packet includes a second set of metadata indicative of transmission characteristics (e.g., latency) of a path between the relay server and the upstream node. If the packet does not contain the first set of metadata, decision block 304 directs the process to supplement the VoIP packet with the first set of metadata at block 308 and communicate the VoIP packet and metadata to the next downstream network node or endpoint at block 310. In this example, the process waits at decision block 312 until a response packet including the second set of metadata is received. In this example, the metadata response is analyzed at block 312 to determine one or more transmission characteristics exhibited by the path between the relay server and the downstream node in the network. At block 314, determined transmission characteristics are provided to the call control server.

Figure 4:
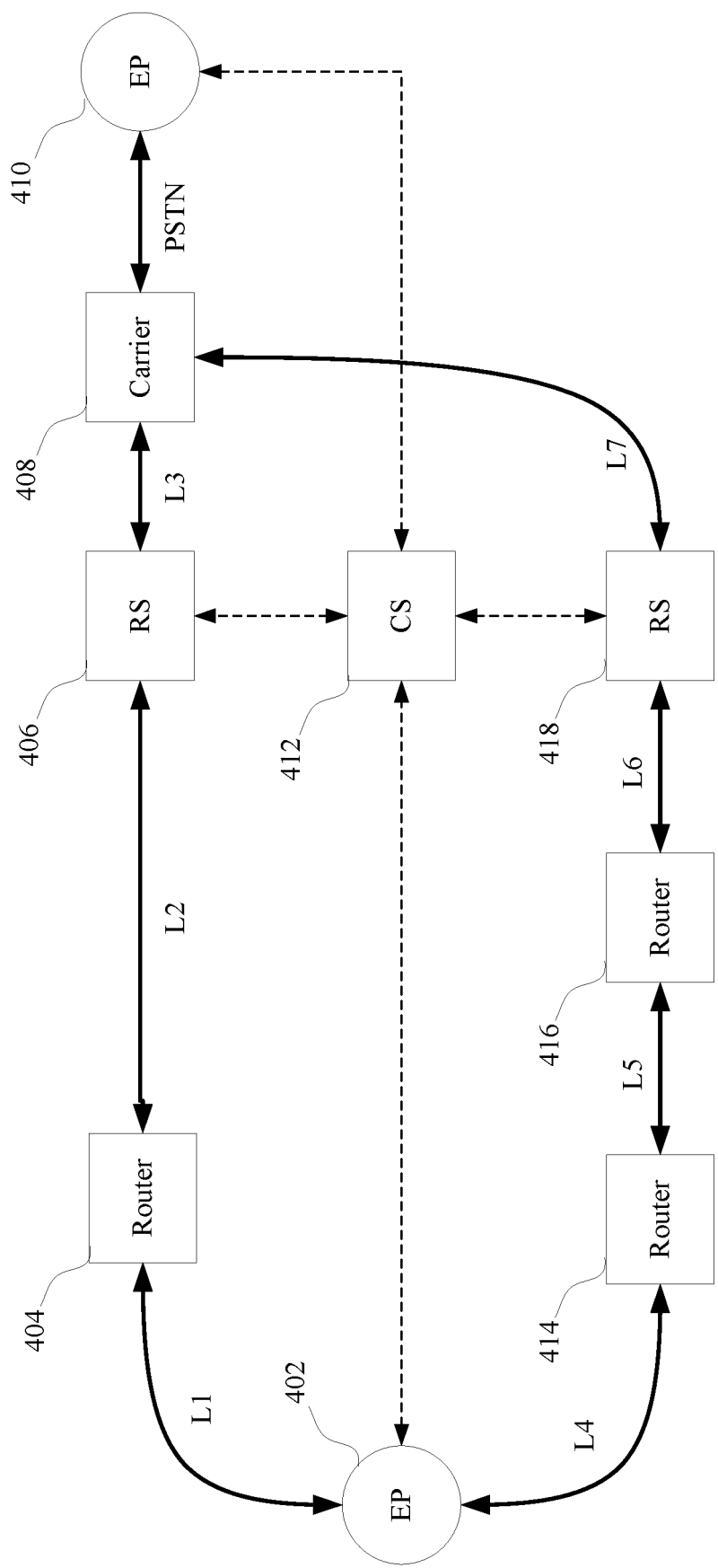
FIG. 4 shows an example network, consistent with one or more embodiments of the present disclosure.

FIG. 4 shows an example network providing multiple paths between source and destination endpoints. In this example, the network includes two relay servers 406 and 418, each of which provide a respective path for communicating VoIP packets between endpoints 402 and 410. Each of the relay servers 406 and 418 are connected to endpoint 410 by a common carrier 408 via a public standard telephone network. Relay server 406 provides a first path between endpoint 402 and the common carrier 408 via IP router 404. Relay server 418 provides a second path between endpoint 402 and the common carrier 408 via IP routers 414 and 416. For ease of explanation, the relay servers 406 and 418 in this example are each shown as providing a single respective path between the endpoints at 402 and 410. However, in some implementations, a relay server may utilize multiple paths for routing VoIP calls. Likewise, in some implementations, a path between two endpoints may include multiple relay servers.

A control server 412 is communicatively connected to the relay servers 406 and 418 in the network. When a VoIP call is initiated, the control server 412 selects one of the relay servers 406 and 418 for routing of the VoIP call. For example, in response to receiving a connection request for a VoIP call from one of the endpoints 402 or 410, the control server 412 selects one of the relay servers 406 and 418 according to a selection algorithm. In response to the selection, the call control server 412 routes VoIP packets for the VoIP call through the selected relay server 406 or 418. As described in more detail with reference to FIGS. 5 and 6, the selection algorithm may select a relay server to route a VoIP call based on various transmission characteristics of available paths in the network including, for example: latency, packet loss, bandwidth and/or quality of service.

As an illustrative example, the control server 412 may select one of the relay servers 406 and 418, which provides a path having the lowest latency. In this example, the first path provided by relay server 406 includes three network links having respective latencies L1, L2 and L3, and the second path provided by relay server 418 includes four network links having respective latencies L4, L5, L6 and L7. Depending on the latencies, although the second path has fewer network links, the total latency of the second path (i.e., L4+L5+L6+L7) may be less than the total latency of the first path (i.e., L1+L2+L3).

As previously described, the relay servers 406 and 418 are configured to communicate metadata along with VoIP data packets to facilitate the determination of the transmission characteristics of the available network links. For example, the metadata may include various information to facilitate determination of latency. In some implementations, the metadata is configured to prompt downstream devices (e.g., routers, switches and/or endpoints) to send a response packet indicative of latency to an upstream device. Such a prompt may include, for example, an Internet Control Message Protocol (IMCP) echo request. The relay server may determine a latency, for example, based on a comparison of a first time that the metadata was sent downstream and a second time which the response packet is received. In some other implementations, latency may be determined by another upstream device (e.g., the control server 412) that directly or indirectly receives the response packet. In some other implementations, latency may be determined by a downstream device and provided in the response packet communicated upstream. For instance, latency may be determined by a downstream device from a timestamp in the metadata indicating the time that the metadata was sent downstream.

The control server 412 is configured to dynamically adjust selection of relay servers 406 and 418 for routing of VoIP calls based on the determined transmission characteristics. In some implementations the control server may additionally or alternatively adjust various parameters of a VoIP call based on the transmission characteristics determined during the call. For instance, the control server may direct a selected relay server 406 or 418 to change the certain bitrate, communication protocol, and/or encryption of the VoIP call based on the determined transmission characteristics.

Figure 5:
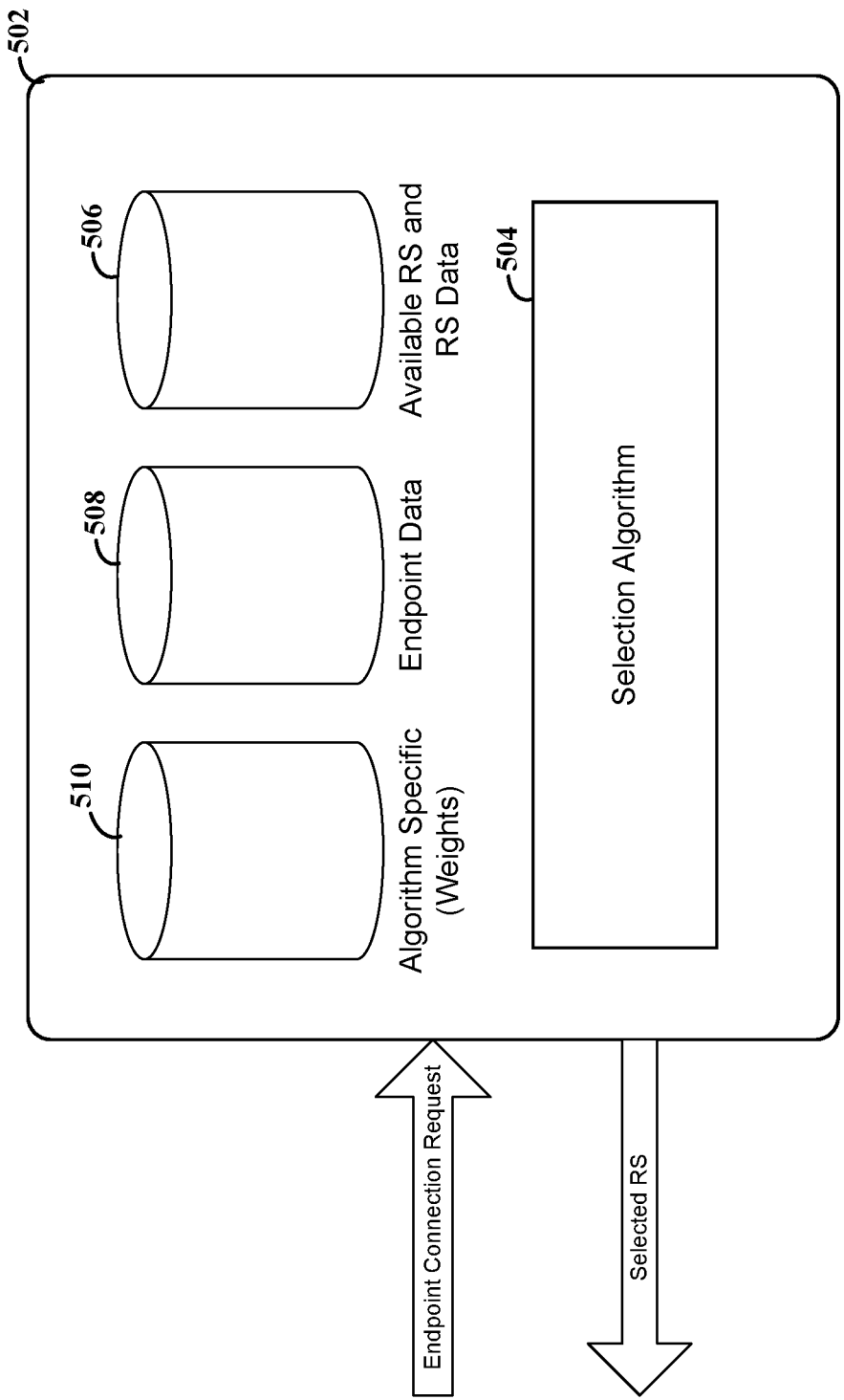
FIG. 5 depicts a block diagram for selecting a relay servers based upon a selection algorithm, consistent with one or more embodiments of the present disclosure.

FIG. 5 depicts a block diagram for selecting a relay server based upon a selection algorithm, consistent with embodiments of the present disclosure. Module 502 can be configured and arranged to respond to a call connection request by using selection algorithm 504 to select one or more relay servers to complete the call. As discussed herein, there are a number of different inputs that can be used by the selection algorithm 504. Some of the inputs relate to information relative to the relay server, as shown by database symbol 506. Others of the inputs can relate to information relative to one or more of the endpoints, as shown by database symbol 508. Further inputs can be directly related to the selection algorithm 504 (e.g., different weights applied to different information/factors), as shown by database symbol 510. Other types of useful information do not necessarily fall within one of these categories, but are not excluded from use in the selection algorithm 504. Moreover, the information can be received from external sources (e.g., as part of the connection request or in response to a query from module 502).

A few non-limiting examples of information include one or more of the number of hops between a source VoIP device and each relay server, the number of hops between each relay server and a next known media relay or termination device, the geographic distances between the source VoIP device, each relay server and the next known media relay or termination device, the load of each relay server and capabilities of an ISP used in the VoIP call.

Embodiments of the present disclosure allow for the selection algorithm to be dynamically updated according to the current operating conditions. For example, call quality data for previous VoIP calls can be provided. This call quality data can be correlated to particular aspects of the related VoIP, e.g., the participating relay servers, the participating endpoints, the participating ISPs and/or the relevant geographic locations of different components. Future calls can then be routed by correlating past call quality with similar aspects of the future calls, and then selecting a relay server with expected acceptable call quality.

Various embodiments of the present disclosure relate to the ability for dynamic modifications to be made to the list of available relay servers. The changes can reflect new relay servers being added or removed. They can also reflect relay servers that become available when new agreements are reached between with the system operator and entities that provide one or more relay servers.

Further embodiments of the present disclosure are directed toward the use of priority ratings for the VoIP calls. The priority rating can indicate preferential treatment for certain callers, so that they are provided access to relay servers with higher call quality before access is provided to callers with a lower priority. The priority can be based upon a number of factors, one of which is the subscription option of the caller. For instance, a caller can subscribe to a premium service or to a discount service, and receive different priorities accordingly. In this manner, the priority can be based upon a subscription type that is associated with one or more of the source identifier and the destination identifier for the VoIP call.

Another priority basis could be the source or destination for the call. As an example, the VoIP system can be configured and arranged to provide a high priority rating in response to the destination identifier indicating that the VoIP call is for emergency services.

Certain embodiments recognize that the use of a geographically disparate relay server can sometimes raise issues of compliance with different laws of different countries. Accordingly, the selection algorithm can include acceptable and/or unacceptable relay server locations based upon the applicable laws of a country involved in a particular call.

Figure 6:
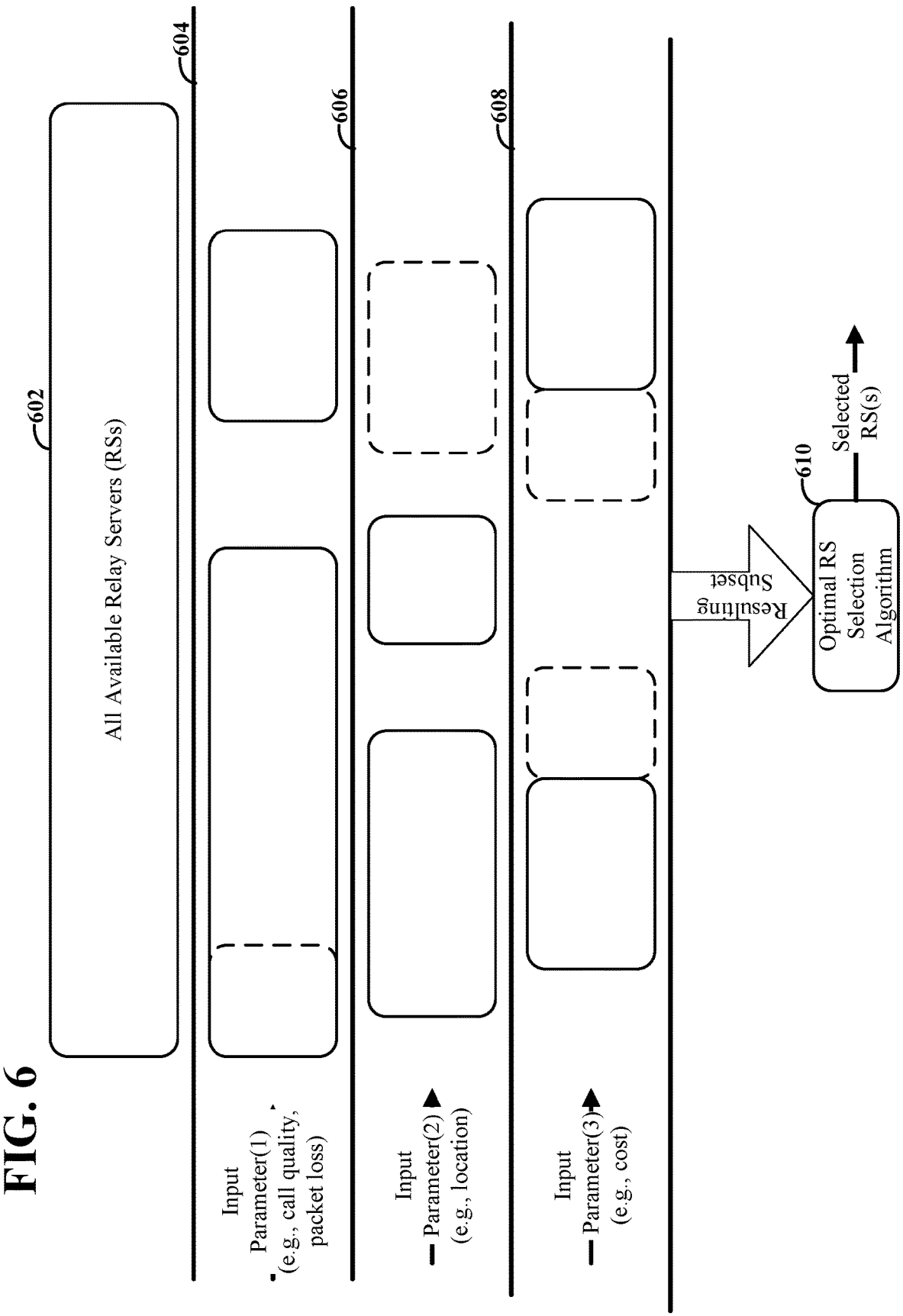
FIG. 6 depicts a block diagram representing aspects of a selection algorithm, consistent with one or more embodiments of the present disclosure.

FIG. 6 depicts a block diagram representing aspects of a selection algorithm, consistent with embodiments of the present disclosure. FIG. 6 shows a set of blocks representing the use of a selection algorithm that first narrows the selection of the total available relay servers 602 to one or more subsets 604, 606 and 608. Each block within subsets 604, 606 and 608 represents a portion of the available relay servers 602. Overlapping portions of the different subsets (in the vertical direction) represent relay servers that meet both respective criteria and that can be passed onto the optimal RsS selection algorithm 610.

The subsets can be selected by narrowing the available relay servers to those relay servers having an acceptable call quality, and then selects between the narrowed subset using other parameters (e.g., load balancing or cost). Performance metrics for the call quality can include various different factors that affect aspects such as packet loss, jitter and delay. In certain embodiments, the size of the subset can be controlled by an adjustable input parameter that defines the acceptable parameters for the subset. For instance, the input parameter for subset 604 could be based upon a maximum number of hops in the transmission path. The algorithm can also be configured to narrow the selection to a subset 606 based upon geographic location (e.g., where the input parameter specifies a maximum distance) or cost 608 (e.g., where the input parameter specifies a maximum cost for using the relay server). Various other subsets can be used alone or in combination to provide a quick and efficient selection technique.

The size of the subsets can be varied according to the respective input parameters. Accordingly, the dotted portions of the subsets 604, 606 and 608 represent either an expansion or reduction in the subset size. The size of the subsets can be varied for a variety of reasons, one of which is that the number of relay servers satisfying each of the input parameters may be too high or too low. The subsets can also each be chosen using a combination of input parameters and a simple or complex relationship can be established between the different input parameters.

In certain embodiments, the algorithm can be configured to recognize the interactions between the different parameters. For instance, the latency of an individual packet may be relatively low for a particular transmission route; however, the call quality may still be very poor when there is high packet loss. Thus, the call control server may select a relay server having a higher latency and a lower packet loss, relative to other relay servers.

Other aspects of the present disclosure utilize the ability of the call control server to dynamical adjust the operating parameters of the call. For instance, if a relay server is capable of dynamically switching codecs during a call, the call control server can direct the relay server to change codecs in response to a real-time evaluation of the call quality. Moreover, the call control server can be configured to select a relay server based upon the capability of a relay server to dynamically switch between codecs. For instance, a connection route between the endpoints and first relay server may exhibit a high packet loss but a significantly lower latency. The algorithm can be configured to select the higher packet loss route and switch to a more packet loss tolerant codec like Internet Low Bitrate Codec (ILBC), assuming the first relay server and the endpoints are capable of using such a codec. Other (non-limiting) examples of voice codecs include G.711, G.723, G.726, G.728 and G.729.

Accordingly, various embodiments factor in the ability of a relay server to provide packet loss concealment (PLC), which can mitigate for lost packets. Different codecs provide different mechanisms for PLC, each having different levels of effectiveness. For instance, certain codecs can account for dead time caused by a lost packet by playing a filler sound (e.g., as sound based upon the last received audio sample). Another factor that can be analyzed is packet size/interval which defines the size of media content that is contained within a single packet. Although a larger packet interval can provide certain benefits (e.g., reduce overhead/bandwidth), it can also accentuate call quality problems caused by packet loss.

Human perception places limits on the amount of latency that is acceptable before voice quality degradation becomes noticeable. For instance, an effective latency of less than about 250 ms from when voice is detected by a microphone to when the voice is reproduced by a speaker, is generally considered sufficient for telephone communications. The algorithm can therefore be configured to budget for the all elements within the transmission path, and not just those elements that are contributing to network delay. One such component is a playout buffer. A playout buffer can be used to store received packets in order to introduce an intentional delay packet to provide a synchronous stream. This can help mitigate variable network delays (jitter) by providing constant delays at the endpoint. In certain embodiments, the call control server can select a relay server as a function of the playout buffer capabilities and settings. Moreover, the call control server can instruct one or both endpoints to adjust the size of their playout buffer according to expected delays from the selected relay server. In certain embodiments, the call control server can determine whether or not the playout buffer is configured to dynamically adjust its buffer size according to the current network conditions and make a relay server selection using this determination.

Embodiments of the present disclosure utilize a relay server selection algorithm that can rank relay servers according to an objective speech quality testing standard. One such standard is Perceptual Evaluation of Speech Quality (PESQ). PESQ (and other potential testing standards) can analyze the transport stream analysis without requiring knowledge of the audio being transmitted. In other instances, a known reference signal can be generated at an endpoint and then the received signal can be compared against the expected/known reference signal. For the former methodology, quality ratings for (combinations of) relay servers, call routes, endpoints and ISPs can be generated from actual usage and also in real time for individual calls. For the latter, the endpoints could be configured to generate the reference signal upon initialization. This reference signal can be routed to multiple relay servers to create a baseline for future selections. Alternative or in addition, the endpoints can generate reference signals at later points in time (e.g., whether randomly, periodically or in response to a prompt from a call control server). For instance, if a new relay server is added to the list of available relay servers, the call control server could request that one or more endpoints transmit a reference signal to the new relay server and thereby establish a baseline call quality measurement.

Consistent with various embodiments, the call control server can select a subset of relay servers to be provided to the user device. The user device can then (randomly or based upon locally-available data) select from the subset. In certain instances, the user device can be configured to locally run a quick test for the relay servers in the subset (e.g., determining delay (packet transit time) for the relay servers) and make a selection from this information. Moreover, the user device could maintain the list for future calls to reduce processing demands on the call control server. The call control server could provide a new subset of relay servers on a periodic basis or in response to a request for update from the endpoint.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., selecting relay servers, routing VoIP packets, or determining transmission characteristics). For example, in certain of the above-discussed embodiments, one or more modules are discrete logic circuits or programmable logic circuits configured and arranged for implementing these operations/activities, as in the circuit modules shown in FIGS. 1 and 4. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. Such modifications do not depart from the true spirit and scope of various aspects of the invention, including aspects set forth in the claims.

What is claimed is:

1. A data communications system in which multiple communication paths, via a plurality of relay servers connected as a subset of nodes in a network, are available for routing of data including VoIP (Voice over Internet Protocol) data between a plurality of endpoints, wherein each of the plurality of endpoints includes circuitry for permitting a user to communicate data including VoIP data over the network, the system comprising:
   computer circuitry communicating VoIP packets between an upstream node and a downstream node, respectively having data processing-communications circuitry, in the network via the plurality of relay servers ("the relay servers") during a VoIP communication session;
   at least one of the plurality of relay servers to communicate a first set of metadata with at least one of the VoIP packets downstream in the network;
   at least one of the plurality of relay servers to
      provide a response packet, including a second set of metadata, to an upstream node in the network in response to receiving the first set of metadata from the upstream node, and derive, in response to receiving the second set of metadata from the downstream node, one or more transmission characteristics of a path between said at least one of the plurality of relay servers and the downstream node, wherein the one or more transmission characteristics include a latency characteristic exhibited by the path between said at least one of the plurality of relay servers and the downstream node; and a server, communicatively coupled to the plurality of relay servers, to respond to a connection request for a VoIP call by identifying a selected one of the plurality of relay servers according to the one or more transmission characteristics and routing VoIP packets for the VoIP call through the selected one of the plurality of relay servers, wherein in operation, via the plurality of relay servers, at least one of the VoIP packets is to be communicated downstream in response to receiving said at least one of the VoIP packets from an upstream node in the network.

2. The system of claim 1, wherein the server is to use the latency characteristic to adjust routing for improving performance of VoIP communications in the system.

3. The system of claim 1, wherein the server is to use the latency characteristic to adjust VoIP-call parameters for improving performance of VoIP communications in the system.

4. The system of claim 1, wherein the server is to use the one or more transmission characteristics to adjust routing for improving performance of VoIP communications in the system.

5. The system of claim 1, wherein the server is to use the one or more transmission characteristics to adjust VoIP-call parameters for improving performance of VoIP communications in the system.

6. The system of claim 1, wherein the computer circuitry is to communicate video data along with the VoIP packets between the upstream node and the downstream node.

7. The system of claim 1, wherein the computer circuitry is to use a relay server control protocol to communicate with at least one of the relay servers and to establish and control a media relay path.

8. The system of claim 1, wherein the computer circuitry is to use a relay server control protocol to communicate with at least one of the relay servers and to establish and control a media relay path, wherein the computer circuitry is to communicate video data along with the VoIP packets through the media relay path.

9. The system of claim 1, wherein said at least one of the plurality of relay servers is to communicate a first set of metadata with at least one of the VoIP packets downstream in the network, in response to discerning from at least one of the VoIP packets received from an upstream node in the network that said at least one of the VoIP packets does not include certain metadata.

10. The system of claim 1, further comprising a network pathway assessment circuit, as part of the computer circuitry, to assess quality-of-service associated with packet-transmission circuitry used in the VoIP communication session.

11. The system of claim 1, wherein the server is used to provide network-address-translation traversal services, via which media is relayed along with the VoIP packets through a selected one of the relay servers.

12. The system of claim 1, wherein the computer circuitry is to direct a selected one of the relay servers to use a first communication protocol for routing the VoIP packets, and during the VoIP communication session, in response to receiving an indication of the latency characteristic, directing the selected one of the relay servers to use a second, different communication protocol for routing subsequent VoIP packets associated with the VoIP communication session.

13. The system of claim 1, wherein the computer circuitry is to respond to a connection request for a VoIP call that is associated with first and second endpoints, from among the plurality of endpoints, by routing VoIP packets for the VoIP call to the first endpoint via a first path and routing VoIP packets for the VoIP call to the second endpoint via a second path having a latency characteristic that is the same as a latency characteristic of the first path.

14. The system of claim 1, wherein the VoIP packets are transmitted over the network as Session Initiation Protocol (SIP) packets.

15. The system of claim 1, wherein the server is to allow the VoIP communication session to proceed while maintaining a call state for the VoIP communication session with voice media being routed through a selected one of the relay servers during the VoIP communication session.

16. The system of claim 1, wherein the server is to dynamically switch to a new one of the plurality of relay servers in response to the one or more transmission characteristics.

17. The system of claim 1, further including a network pathway assessment circuit coupled to or integrated as part of a call control server and configured to set up the VoIP communication session.

18. A data communications system comprising:
computer circuitry communicating call-related packets between an upstream node and a downstream node, respectively having data processing-communications circuitry via a plurality of relay servers, connected as a subset of nodes in a network;
at least one of the plurality of relay servers to communicate a first set of metadata with at least one of the call-related packets downstream in the network;
at least one of the plurality of relay servers to
provide a response packet, including a second set of metadata, to an upstream node in the network in response to receiving the first set of metadata from the upstream node, and
derive, in response to receiving the second set of metadata from the downstream node, one or more transmission characteristics of a path between said at least one of the plurality of relay servers and the downstream node, wherein the one or more transmission characteristics include a latency characteristic exhibited by the path between said at least one of the plurality of relay servers and the downstream node; and
a server, communicatively coupled to the plurality of relay servers, to respond to a connection request for a call by identifying a selected one of the plurality of relay servers according to the one or more transmission characteristics and routing call-related packets for the call through the selected one of the plurality of relay servers, wherein in operation, via the plurality of relay servers, at least one of the call-related packets is to be communicated downstream in response to receiving said at least one of the call-related packets from an upstream node in the network.

19. A method comprising:
communicating, via at least one of a plurality of relay servers, a first set of metadata with at least one call-related data packet downstream, between an upstream node and a downstream node connected via at least one broadband network which includes the plurality of relay servers;

via at least one of the plurality of relay servers,
- providing a response packet, including a second set of metadata, to an upstream node in the at least one broadband network in response to receiving the first set of metadata from the upstream node, and
- deriving, in response to receiving the second set of metadata from the downstream node, one or more transmission characteristics of a path between said at least one of the plurality of relay servers and the downstream node, wherein the one or more transmission characteristics include a latency characteristic exhibited by the path between said at least one of the plurality of relay servers and the downstream node; and causing a response to a connection request for a call by identifying a selected one of the plurality of relay servers according to the one or more transmission characteristics and routing the call through the selected one of the plurality of relay servers, wherein the at least one call-related data packet is to be communicated downstream in response to receiving said at least one of the data packets from an upstream node in the at least one broadband network.

20. The method of claim 19, further including using the one or more transmission characteristics to adjust call-based parameters for improving performance of another call.

* * * * *